United States Patent [19]
Hayashi

[11] Patent Number: 5,734,427
[45] Date of Patent: Mar. 31, 1998

[54] HIGH RESOLUTION ELECTRONIC STILL CAMERA WITH AN ELECTRONIC VIEWFINDER FOR DISPLAYING A REDUCED IMAGE

[75] Inventor: Kenkichi Hayashi, Asaka, Japan

[73] Assignee: Fuji Photo Film Co., Ltd., Kanagawa, Japan

[21] Appl. No.: 442,653

[22] Filed: May 16, 1995

[30] Foreign Application Priority Data

May 19, 1994 [JP] Japan .................. 6-105097

[51] Int. Cl.[6] .................................... H04N 5/225
[52] U.S. Cl. .................................... 348/333; 348/458
[58] Field of Search .................. 348/333, 272, 348/273, 450, 458

[56] References Cited

U.S. PATENT DOCUMENTS

| | | | |
|---|---|---|---|
| 4,740,828 | 4/1988 | Kinoshita | 348/333 |
| 4,837,817 | 6/1989 | Maemori | 348/333 |
| 4,876,590 | 10/1989 | Parulski | 348/333 |
| 5,043,811 | 8/1991 | Yasuhiro | 348/458 |
| 5,179,446 | 1/1993 | Hong | 348/333 |
| 5,418,565 | 5/1995 | Smith | 348/273 |
| 5,493,335 | 2/1996 | Parulski et al. | 348/233 |

*Primary Examiner*—Wendy Garber

[57] ABSTRACT

In an electronic still camera, an imaging device outputs a high-resolution image signal representative of an optical image incident thereto via a lens. A movie processing section reduces, or thins, the high-resolution image signal to produce a corresponding low-resolution image signal on a real-time basis. The camera, therefore, implements the real-time display of a picture converted from the high-resolution image of a subject on a monitor.

21 Claims, 5 Drawing Sheets

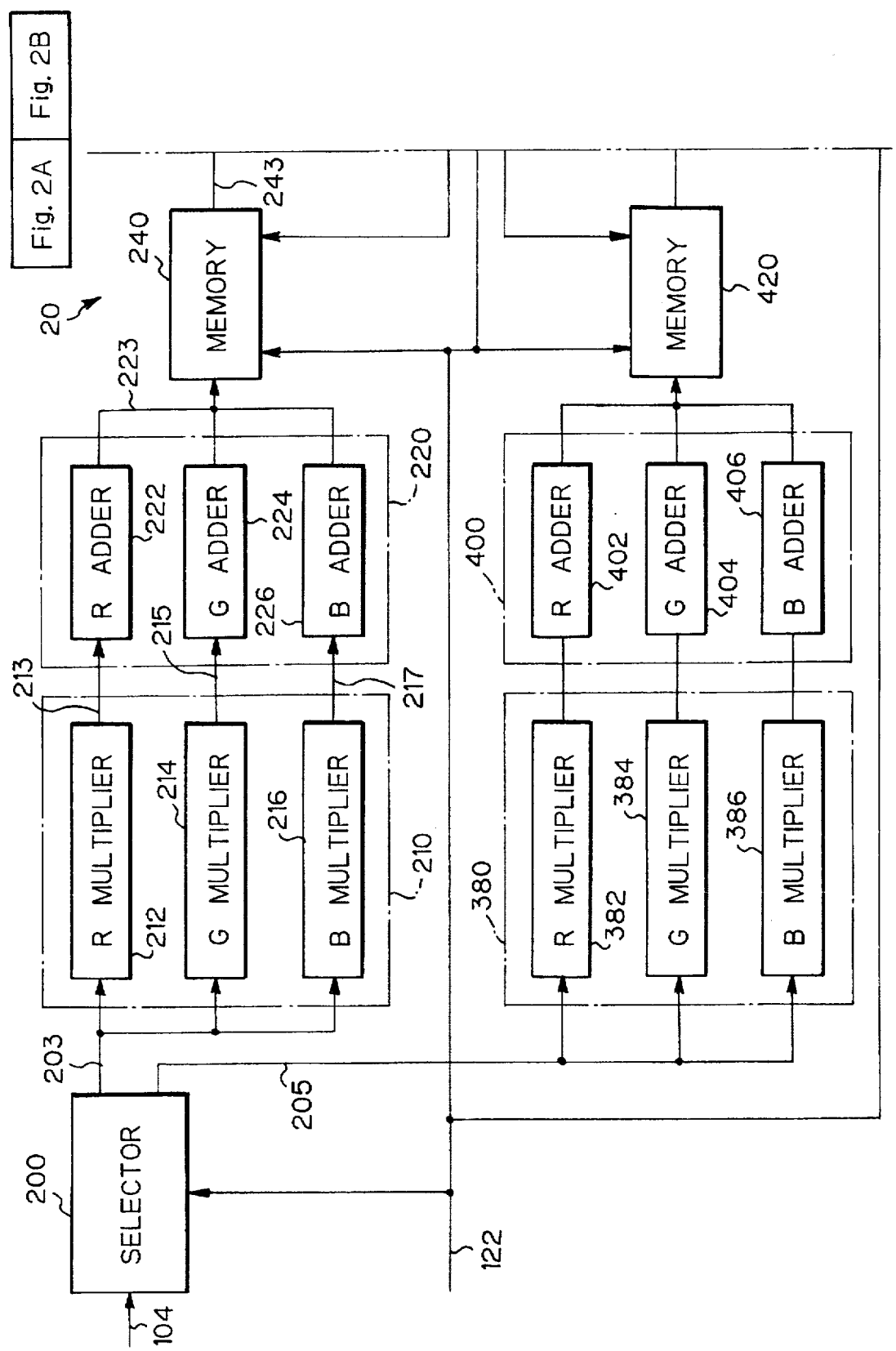

Fig. 3A

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | $R_1$ | $G_1$ | $B_1$ | $G_2$ | $R_2$ | $G_3$ | $B_2$ | $G_4$ | $R_3$ | $G_5$ | $B_3$ | $G_6$ | $R_4$ | $G_7$ | $B_4$ | $G_8$ |
| 2 | $B_1$ | $G_1$ | $R_1$ | $G_2$ | $B_2$ | $G_3$ | $R_2$ | $G_4$ | $B_3$ | $G_5$ | $R_3$ | $G_6$ | $B_4$ | $G_7$ | $R_4$ | $G_8$ |
| 3 | $R_1$ | $G_1$ | $B_1$ | $G_2$ | $R_2$ | $G_3$ | $B_2$ | $G_4$ | $R_3$ | $G_5$ | $B_3$ | $G_6$ | $R_4$ | $G_7$ | $B_4$ | $G_8$ |
| 4 | $B_1$ | $G_1$ | $R_1$ | $G_2$ | $B_2$ | $G_3$ | $R_2$ | $G_4$ | $B_3$ | $G_5$ | $R_3$ | $G_6$ | $B_4$ | $G_7$ | $R_4$ | $G_8$ |

Fig. 3B

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | $R_1$ | $G_1$ | $B_1$ | $G_2$ | $R_2$ | $G_3$ | $B_2$ | $G_4$ | $R_3$ | $G_5$ | $B_3$ | $G_6$ | $R_4$ | $G_7$ | $B_4$ | $G_8$ |
| 2 | $R_1$ | $G_1$ | $B_1$ | $G_2$ | $R_2$ | $G_3$ | $B_2$ | $G_4$ | $R_3$ | $G_5$ | $B_3$ | $G_6$ | $R_4$ | $G_7$ | $B_4$ | $G_8$ |

Fig. 3C

|   | 1 | 2 | 3 | 4 | 5 | 6 | 7 | 8 |
|---|---|---|---|---|---|---|---|---|
| 1 | $R_{11}$ | $G_{11}$ | $B_{11}$ | $G_{22}$ | $R_{22}$ | $G_{33}$ | $B_{22}$ | $G_{44}$ |
| 2 | $R_{11}$ | $G_{11}$ | $B_{11}$ | $G_{22}$ | $R_{22}$ | $G_{33}$ | $B_{22}$ | $G_{44}$ |

Fig. 3D

|   | 1 | 2 | 3 | 4 | 5 | 6 | 7 | 8 |
|---|---|---|---|---|---|---|---|---|
| 1 | $R_{111}$ | $R_{222}$ | $R_{333}$ | $R_{444}$ | $R_{555}$ | $R_{666}$ | $R_{777}$ | $R_{888}$ |
| 1 | $G_{111}$ | $G_{222}$ | $G_{333}$ | $G_{444}$ | $G_{555}$ | $G_{666}$ | $G_{777}$ | $G_{888}$ |
| 1 | $B_{111}$ | $B_{222}$ | $B_{333}$ | $B_{444}$ | $B_{555}$ | $B_{666}$ | $B_{777}$ | $B_{888}$ |
| 2 | $R_{111}$ | $R_{222}$ | $R_{333}$ | $R_{444}$ | $R_{555}$ | $R_{666}$ | $R_{777}$ | $R_{888}$ |
| 2 | $G_{111}$ | $G_{222}$ | $G_{333}$ | $G_{444}$ | $G_{555}$ | $G_{666}$ | $G_{777}$ | $G_{888}$ |
| 2 | $B_{111}$ | $B_{222}$ | $B_{333}$ | $B_{444}$ | $B_{555}$ | $B_{666}$ | $B_{777}$ | $B_{888}$ |

Fig. 4A

|   | 1 | 2 | 3 | 4 | 5 | 6 | 7 | 8 | 9 | 10 | 11 | 12 |
|---|---|---|---|---|---|---|---|---|---|----|----|----|
| 1 | $R_1$ | $G_1$ | $B_1$ | $R_2$ | $G_2$ | $B_2$ | $R_3$ | $G_3$ | $B_3$ | $R_4$ | $G_4$ | $B_4$ |
| 2 | $R_1$ | $G_1$ | $B_1$ | $R_2$ | $G_2$ | $B_2$ | $R_3$ | $G_3$ | $B_3$ | $R_4$ | $G_4$ | $B_4$ |
| 3 | $R_1$ | $G_1$ | $B_1$ | $R_2$ | $G_2$ | $B_2$ | $R_3$ | $G_3$ | $B_3$ | $R_4$ | $G_4$ | $B_4$ |
| 4 | $R_1$ | $G_1$ | $B_1$ | $R_2$ | $G_2$ | $B_2$ | $R_3$ | $G_3$ | $B_3$ | $R_4$ | $G_4$ | $B_4$ |

Fig. 4B

|   | 1 | 2 | 3 | 4 | 5 | 6 | 7 | 8 | 9 | 10 | 11 | 12 |
|---|---|---|---|---|---|---|---|---|---|----|----|----|
| 1 | $R_1$ | $G_1$ | $B_1$ | $R_2$ | $G_2$ | $B_2$ | $R_3$ | $G_3$ | $B_3$ | $R_4$ | $G_4$ | $B_4$ |
| 2 | $R_1$ | $G_1$ | $B_1$ | $R_2$ | $G_2$ | $B_2$ | $R_3$ | $G_3$ | $B_3$ | $R_4$ | $G_4$ | $B_4$ |

Fig. 4C

|   | 1 | 2 | 3 | 4 | 5 | 6 |
|---|---|---|---|---|---|---|
| 1 | $R_{11}$ | $G_{11}$ | $B_{11}$ | $R_{22}$ | $G_{22}$ | $B_{22}$ |
| 2 | $R_{11}$ | $G_{11}$ | $B_{11}$ | $R_{22}$ | $G_{22}$ | $B_{22}$ |

Fig. 4D

|   |   | 1 | 2 | 3 | 4 | 5 | 6 |
|---|---|---|---|---|---|---|---|
| 1 |   | $R_{111}$ | $R_{222}$ | $R_{333}$ | $R_{444}$ | $R_{555}$ | $R_{666}$ |
|   |   | $G_{111}$ | $G_{222}$ | $G_{333}$ | $G_{444}$ | $G_{555}$ | $G_{666}$ |
|   |   | $B_{111}$ | $B_{222}$ | $B_{333}$ | $B_{444}$ | $B_{555}$ | $B_{666}$ |
| 2 |   | $R_{111}$ | $R_{222}$ | $R_{333}$ | $R_{444}$ | $R_{555}$ | $R_{666}$ |
|   |   | $G_{111}$ | $G_{222}$ | $G_{333}$ | $G_{444}$ | $G_{555}$ | $G_{666}$ |
|   |   | $B_{111}$ | $B_{222}$ | $B_{333}$ | $G_{444}$ | $B_{555}$ | $B_{666}$ |

HIGH RESOLUTION ELECTRONIC STILL CAMERA WITH AN ELECTRONIC VIEWFINDER FOR DISPLAYING A REDUCED IMAGE

BACKGROUND OF THE INVENTION

1. Field of the Invention

The present invention generally relates to an electronic still camera for shooting a desired subject and recording a high-resolution image signal representative of the subject in a semiconductor memory card or similar memory device. More particularly, the present invention is concerned with an electronic still camera capable of providing the real-time display of a subject being aimed at on a monitor.

2. Description of the Background Art

A still camera using a silver halide sensitive type of film as a recording medium is traditional. There has recently been put on the market an electronic still camera whose recording medium is implemented by a semiconductor memory card. With an electronic still camera, it is possible to shoot a desired subject and record it in the memory card in the form of a digital image signal. For the imaging device of this kind of camera, use is generally made of a CCD (Charge Coupled Device) image sensor having, for example, about 400,000 pixels capable of producing images of standard resolution. An advanced electronic still camera is provided with a CCD image sensor having as many as 1,300,000 pixels or so in order to meet the need for high-resolution images.

To monitor the image of a subject being aimed at by the advanced or high-resolution electronic still camera, an HDTV (High Definition Television) receiver or similar high-resolution monitor is used. This brings about various problems, as follows. To reproduce a monitor image with a high-resolution signal having about 1,300,000 pixels or so, not only a high-resolution monitor is necessary, but also the reproduction needs a substantial period of time, i.e., real-time reproduction is not achievable. Therefore, this kind of monitor is not desirable as the viewfinder of the camera. Further, an HDTV receiver or similar high-resolution monitor is expensive, needs a broad space for installation, and consumes great power. Moreover, image information available with the high-resolution camera cannot be directly displayed on a monitor of standard resolution, e.g., an NTSC (National Television System Committee) color TV receiver.

It has been customary with this kind of still camera to adjust the angle thereof to an object by use of an optical viewfinder mounted on the camera. This, however, prevents the angle, as well as other factors particular to the camera, from being controlled at a remote place.

SUMMARY OF THE INVENTION

It is, therefore, an object of the present invention to provide an electronic still camera capable of providing the real-time reproduction of the image of a desired subject even when it has a high resolution.

It is another object of the present invention to provide an electronic still camera capable of being controlled at a remote place with a monitor serving as a viewfinder.

In accordance with the present invention, an electronic still camera has an imaging device for shooting a subject and outputting a corresponding first image signal having a high resolution and to be recorded in a recording medium. A processing circuit thins the first image signal to thereby produce a second image signal having a low resolution. The second image signal is via an output terminal on a real-time basis.

Also, in accordance with the present invention, an electronic still camera has a high-resolution imaging device for shooting a subject and outputting corresponding high-resolution pixel data to be recorded in a recording medium. The pixel data consists of a plurality of predetermined colors repeatedly appearing in a predetermined order at least in the direction of horizontal scanning lines. A processing circuit thins the high-resolution image data output from the imaging device to thereby produce low-resolution image data. The low-resolution image data are output via an output terminal on a real-time basis. An image represented by the low-density image data from the output terminal is displayed on a viewfinder connected to the output terminal and implemented by a video monitor.

BRIEF DESCRIPTION OF THE DRAWINGS

The objects and features of the present invention will become more apparent from the consideration of the following detailed description taken in conjunction with the accompanying drawings in which:

FIG. 2 shows how FIGS. 2A and 2B are combined;

FIGS. 2A and 2B are schematic block diagrams showing, when combined as shown in FIG. 2, a movie processing section included in the embodiment specifically;

FIGS. 3A–3D demonstrate a signal processing procedure which the movie processing section executes with pixel data generated by a high-resolution CCD image sensor having a G stripe, RB full-checker filter arrangement; and FIGS. 4A–4D demonstrate a procedure similar to the procedure of FIGS. 3A–3D, but dealing with pixel data generated by a high-resolution CCD image sensor having an RGB stripe color filter arrangement.

DESCRIPTION OF THE PREFERRED EMBODIMENT

Figure 1:
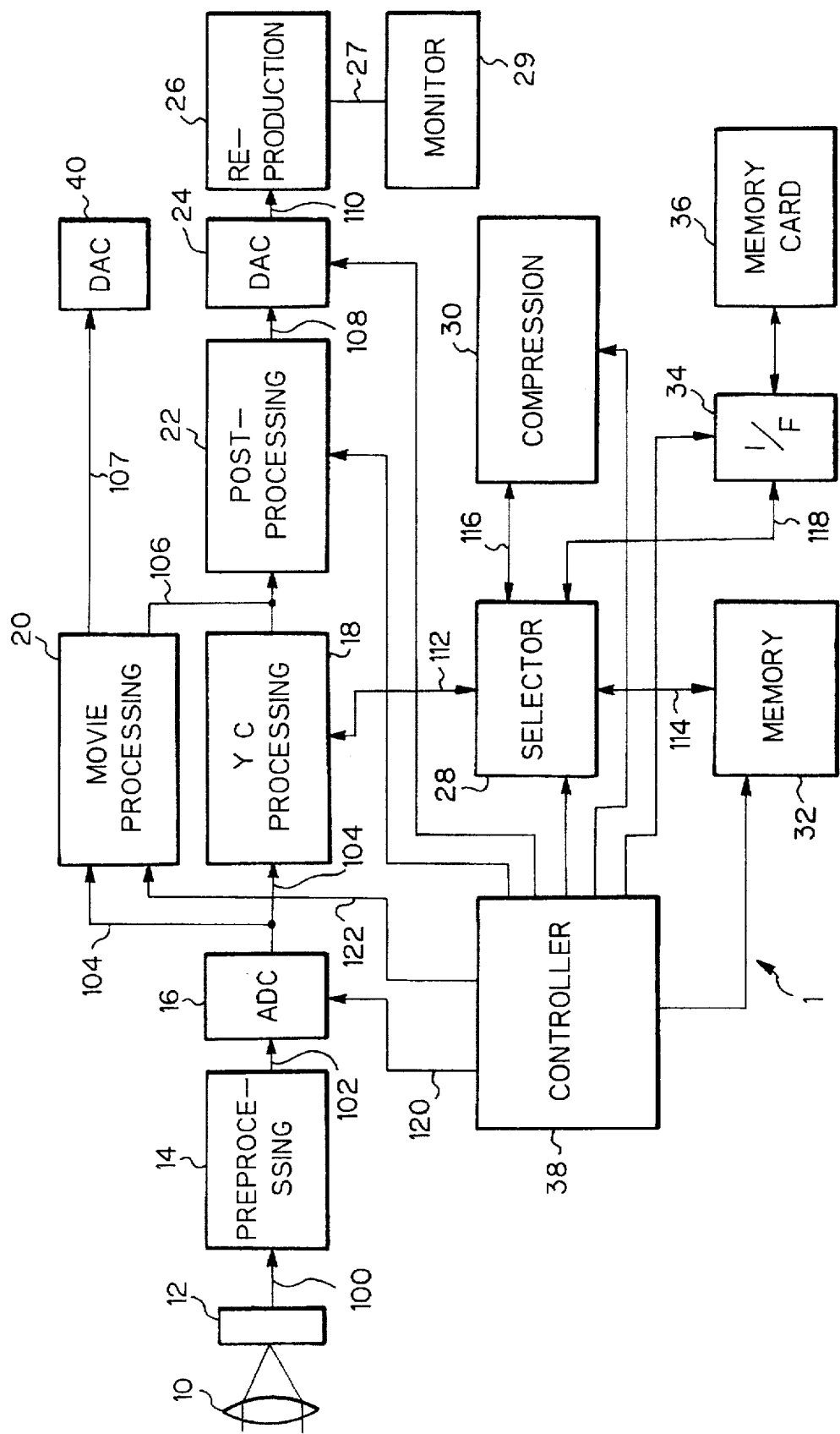
FIG. 1 is a block diagram schematically showing an electronic still camera embodying the present invention.

Referring to FIG. 1 of the drawings, an electronic still camera embodying the present invention is shown and generally designated by the reference numeral 1. As shown, the camera 1 shoots a subject via a lens 10 and generates an electric signal representative of the subject. The electric signal is applied to a reproduction 26 and transformed to a visible image thereby. At the same time, high-resolution image data represented by the electric signal is compressed and then written to a memory card 36 removably mounted to the camera 1. The memory card 36, implemented by a semiconductor memory, is capable of storing digital image data input from the camera 1 and allowing them to be read thereoutof, as needed. The camera 1 includes a movie processing 20 for converting the high-resolution electric signal representative of the subject to a low-resolution signal by thinning it. This allows the image of the subject to appear on a monitor 29 via the reproduction 26 on a real-time basis.

Specifically, the input optical image of a subject is focused by the lens 10 onto the light-sensitive surface of a solid-state imaging device 12. In response, the imaging device 12 outputs an electric signal representative of the incident image. In the illustrative embodiment, the imaging device 12 is implemented as a CCD image sensor having about 1,300,000 pixels for a high-resolution camera or about 400,000 pixels for a standard resolution camera. It is to be noted that 1,300,000 pixels and 400,000 pixels respectively correspond to 1,280 (horizontal)×1,024 (vertical) dots and 640 (horizontal)×512 (vertical) dots in terms of the number of display dots. The image sensor 12 delivers its output 100, i.e., an image signal to a preprocessing 14. The preprocessing 14 amplifies the input image signal to a predetermined level and executes various kinds of conventional processing, including black level correction, white balance correction and gamma correction, with the amplified image signal. The output 102 of the preprocessing 14 is delivered to an analog-to-digital converter (ADC) 16. The ADC 16 is made up of a circuit for converting the input, or analog image signal, to digital values, and a frame memory capable of storing at least one frame of high-resolution digital image data. The image data are read out of the frame memory under the control of a controller 38 which will be described. The output 104 of the ADC 16 is connected to the input of a YC processing 18 and the previously mentioned movie processing 20.

The YC processing 18 transforms R (Red), G (Green) and B (Blue) image data appearing on its input 104 and having a high resolution or a standard resolution to luminance data Y and chrominance data R-Y and B-Y. The processing 18 produces the luminance data Y and chrominance data R-Y and B-Y of standard resolution on one output 106. At the same time, the processing 18 produces the luminance data Y and chrominance data R-Y and B-Y of standard resolution or those of high resolution on the other output 112. The outputs 106 and 112 are connected to a postprocessing 22 and a selector 28, respectively. The postprocessing 22 executes contour correction with the luminance data Y of standard resolution arrived at its input 106, while executing color correction with the chrominance data R-Y and B-Y of standard resolution. These corrected data Y, R-Y and B-Y are fed from the postprocessing 22 to a digital-to-analog converter (DAC) 24 over a signal line 108.

The DAC 24 transforms the input image signal 108 to an image signal represented by analog values and produces them on an output 110 which is connected to the reproduction 26. In the embodiment, the reproduction 26 converts the input image signal to an NTSC video signal. The NTSC video signal is applied to the monitor 29 via the output 27 of the reproduction 26 and reproduced as an image thereby. If the monitor 29 is of the PAL (Phase Alternation Line) system or the SECAM (Sequential Couleur a Memoire) system, the reproduction 26 may transform the input image signal 110 to a video signal based on the PAL or SECAM system. The monitor 29 is connected to the reproduction 26 by a wire or radio 27 so as to play the role of a viewfinder. In addition, this connection 27 may have a fixed configuration or a separable configuration. Of course, the camera 1 may have an optical viewfinder thereon in addition to the independent viewfinder 29.

The selector 28 transfers input image data to a desired circuit under the control of the controller 38. Specifically, the selector 28 receives the image data from the YC processing 18 and having a predetermined format over the connection line 112, and transfers them to a memory 32 over a connection line 114. The memory 32 is implemented as a video RAM (Random Access Memory) by way of example and capable of storing at least one frame of high-resolution image data appearing on the input 114. The image data stored in the memory 32 are read out and applied to the selector 38 via the output 114 under the control of the controller 38. In response, the selector 38 transfers the image data to a compression 30 via its output 116. The compression 30 compresses the image data of standard resolution or high resolution by bidimensional orthogonal transform, normalization, Huffman coding or similar coding scheme under the control of the controller 38. An interface (I/F) 34 is connected to another output 118 of the selector 118. The compressed image data from the compression 30 are delivered to the I/F 34 by way of the selector 28 under the control of the controller 38. The I/F 34 transfers to the memory card 36 the compressed image data, as well as other data, from the selector 30 and control signals from the controller 38. Also, the I/F 34 transfers data, including compressed image data, received from the memory card 36 to the selector 28.

The controller 38 has a first control circuit, not shown, for controlling the various sections of the camera 1 stated above, and a second control circuit, not shown, exclusively assigned to the movie processing 20. In an application in which the image of a subject is output from the high-resolution CCD image sensor 12 and monitored by the NTSC monitor 29, the second control circuit is adapted to generate a control signal for causing high-resolution image data to be read out of the frame memory of the ADC 16 while being thinned in matching relation to the number of dots of the monitor 29 in the horizontal and vertical directions. Further, the second control circuit feeds various control signals to the movie processing 20 which processes the image data read out of the frame memory.

Figure 2B:
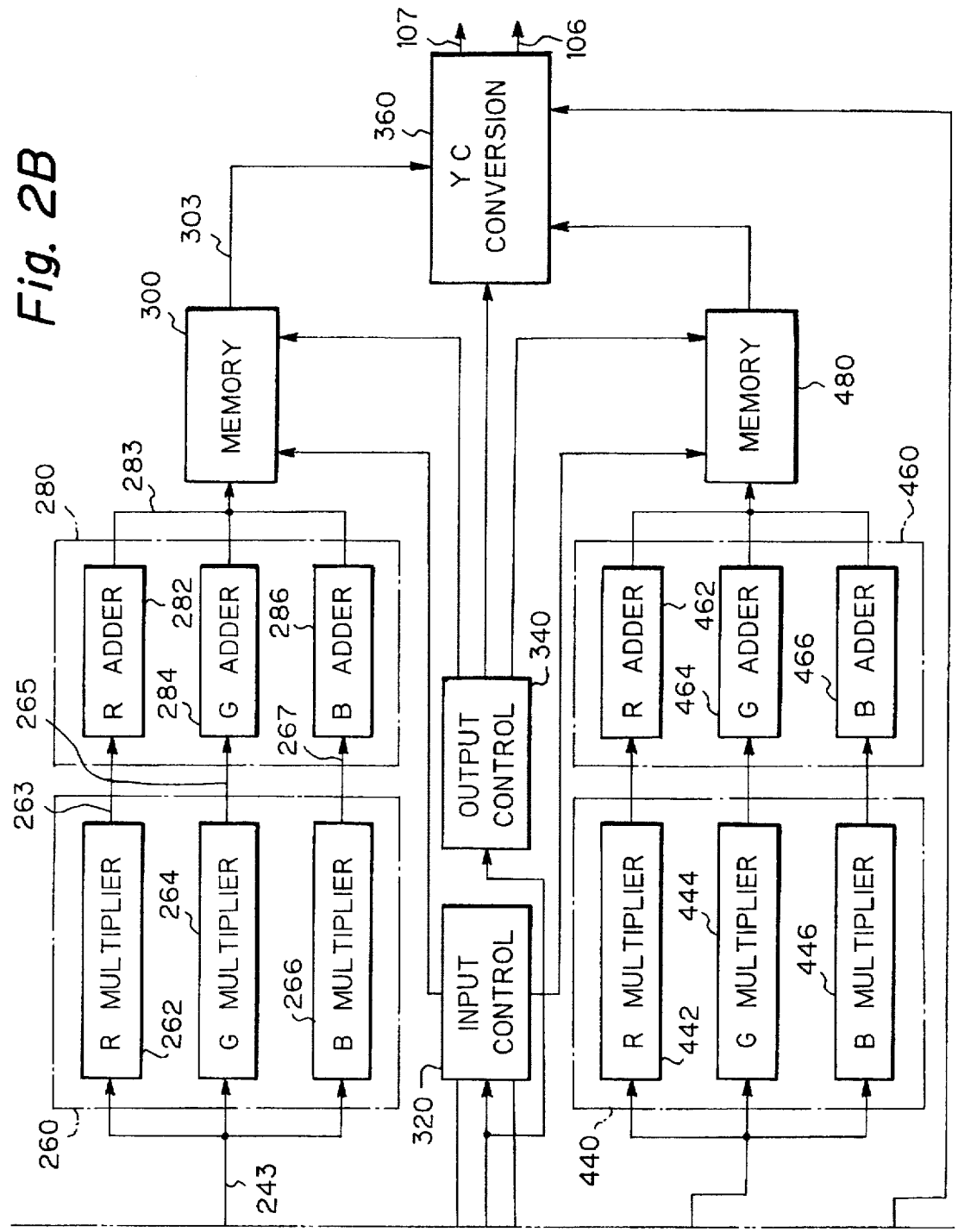

FIGS. 2A and 2B show, when combined as shown in FIG. 2, the circuit arrangement of the movie processing 20 specifically. As shown, the movie processing 20 receives image data R, G and B generated by the high-resolution image sensor 12 via the input 104 thereof. The processing 20 transforms the image data R, G and B to luminance data Y and chrominance data R-Y and B-Y having a particular number of pixels which can be displayed on the NTSC monitor 29, or transforms them to color signals R, G and B. The data Y, R-Y and B-Y or the signals R, G and B appear on the output 106 or 107 of the processing 20. Specifically, the processing 20 is made up of a selector 200, first to fourth multiplier circuits 210, 260, 380 and 440, first to fourth adder circuits 220, 280, 400 and 460, first to fourth memories 240, 300, 420 and 480, an input control 320, an output control 340, and a YC converter 360.

The multiplier circuit 210, adder circuit 220, memory 240, multiplier circuit 260, adder circuit 280, memory 300 and YC converter 360 constitute a first conversion route for the image data appearing on the input 104. Likewise, the multiplier circuit 380, adder circuit 400, memory 420, multiplier circuit 440, adder circuit 460, memory 480 and YC converter 360 constitute a second conversion route. The selector 200 selects either the first conversion route or the second conversion route as commanded by a control signal from the second control circuit of the controller 38. The input control 320 and output control 340 respectively feed control signals to the memories 240 and 300 and the memories 420 and 480 belonging to the first and second conversion routes.

In the illustrative embodiment, the frame memory of the ADC 16, FIG. 1, stores image data having 1,280 dots in the horizontal direction and 1,024 dots in the vertical direction. A control signal 120 from the second control circuit of the controller 38 causes the horizontal 1,280 dots to be read out as they are, but causes the vertical 1,024 dots to be read out every other line. The image data so read out of the frame memory are applied to the input 104 of the selector 200. The control signal 120 may be of the kind matching the resolution of the monitor 29, FIG. 1. The second control circuit of the controller 38 also sends a select signal 122 to the selector 200. In response, the selector 200 selects one of the the first and second conversion routes. The selector 200 produces the input image data on an output 203 when selected the first route or produces them on an output 205 when selected the second route. The outputs 203 and 205 are connected to the inputs of the multiplier circuits 210 and 380, respectively.

The multiplier circuit 210 has an R multiplier 212, a G multiplier 214, and a B multiplier 216 which respectively receive the high-resolution image data R, G and B on their inputs 203. The circuit 210 multiplies each of the image data R, G and B by a particular coefficient stored in a non-volatile memory, e.g., a ROM. Specifically, the R multiplier 212 multiplies the image data R by a predetermined coefficient and produces a product on an output 213. Likewise, the G multiplier 214 and B multiplier 216 respectively multiply the image data G and B by predetermined coefficients and produces products on outputs 215 and 217. The outputs 213, 215 and 217 of the R multiplier 212, G multiplier 214 and B multiplier 216 are respectively applied to an R adder 222, a G adder 224, and a B adder 226 which constitute the adder circuit 220.

Basically, the R adder 222 adds the input image data R appearing at a preselected sampling point and another sampling point different therefrom, thereby producing a sum on an output 223. Likewise, the G adder 224 and B adder 226 respectively add the image data G and image data B and produce their sums on the outputs 223. It is to be noted that the number of sampling points is open to choice and may be determined in conformity to the system configuration. In the embodiment, the R, G and B image data on one horizontal line and appearing on the outputs 223 of the R, G and B adders 222, 224 and 226, respectively, each has a number of pixels which is one half of the number of pixels of the input image data. Consequently, the total number of R, G and B pixels or dots on one horizontal line is 640 which is one half of the input 1,280 dots. The outputs 223 of the R, G and B adders 222, 224 and 226 are connected to the input of the memory 240.

The memory 240, implemented by a video RAM or similar memory device, is capable of storing at least one frame of image data (640 (horizontal)×512 (vertical) dots) appearing on the input 223. In this sense, the memory 240 serves as a frame memory. In response to a write control signal from the second control circuit of the controller 38, the image data R, G and B are sequentially written to the predetermined address locations of the memory 240. The input control 320 delivers a read control signal to the memory 240 on the basis of a write start signal 122 received from the second control circuit of the controller 38. The read control signal causes the image data R, G and B to be read out of the predetermined address locations of the memory 240. The output 243 of the memory 240 is connected to the multiplier circuit 260.

The multiplier circuit 260 using, for example, a ROM multiplies each of the input pixel data R, G and B by a particular coefficient. For this purpose, the circuit 260 has an R multiplier 262, a G multiplier 264, and a B multiplier 266. The R multiplier 262 multiplies the pixel data R by a predetermined coefficient and outputs the resulting product on an output 263. Likewise, the G multiplier 264 and B multiplier 266 respectively multiply the pixel data G and pixel data B by predetermined coefficients and produce products on outputs 265 and 267. The outputs 263, 265 and 267 are respectively connected to the inputs of an R adder 282, a G adder 284 and B adder 286 belonging to the adder circuit 280.

The R adder 282 adds the input image data R appeared at a preselected sampling point and another sampling point different therefrom, thereby producing a sum on an output 283. Likewise, the G adder 284 and B adder 286 respectively add the image data G and image data B and produce their sums on the outputs 283. Again, the number of sampling points is open to choice and may be selected in matching relation to the system configuration. In the illustrative embodiment, the adders 282-286 interpolate the pixels and thereby respectively produce the pixel data R, G and B of the sampling points on the output 283. The adders 282-286, therefore, each outputs 640 dots of pixel data on one horizontal line. The outputs 283 of the adders 286 are connected to the input of the second memory 300.

The memory 300, like the memory 240, is implemented by a video RAM by way of example. In the embodiment, the memory 300 is capable of storing the image data R, G and B (640 (horizontal)×512 (vertical)×3 (color distinction) dots) appearing on the input 283. The input control 320 also delivers a write control signal to the memory 300 on the basis of the write start signal 122 from the second control circuit of the controller 38. The signal 122 causes the image data R, G and B to be sequentially written to the predetermined address locations of the memory 300. The output control 340 feeds an interlace read control signal to the memory 300 in response to the signal 122. As a result, the image data R, G and B are read out of the predetermined address locations of the memory 300 and transferred to the YC converter 360 via an output 303.

The YC converter 360 has, for example, a multiplier, adder and subtractor and receives the pixel data R, G and B from one of the memories 300 and 480. The output control 340 delivers a control signal to the converter 360 in response to the read start signal 122 received from the controller 38. In response, the converter 360 transforms the image data R, G and B to luminance data Y (640 (horizontal)×512 (vertical) dots) and chrominance data R-Y and B-Y (640 (horizontal)×512 (vertical) dots each). These data Y, R-Y and B-Y appear on the output 106. The converter 360 includes a selecting circuit for selecting one of the image data from the memories 300 and 480 in response to a switch signal 122 from the controller 38. The image data R, G and B from the memory 300 or 480 selected appear on an output 107.

As stated above, the input control 320 generates a read control signal meant for the memory 240 or 420 in response to the read start signal 122 from the second control circuit of the controller 38. In addition, the input control 320 generates a write control signal meant for the memory 300 or 480 in response to the signal 122. On the other hand, the output control 340 delivers an interlace or non-interlace read control signal to the memory 300 or 480 in response to the read control signal 122 from the second control circuit. At the same time, the output control 340 feeds a control signal for image processing to the YC converter 360.

Referring again to FIG. 1, the output 107 of the movie processing 20, i.e., digital image signal R, G and B are applied to a DAC 40. The DAC 40 transforms the image data R, G and B to an analog image signal and applies it to a monitor, not shown. For this monitor, use may be made of an RGB 525/50 type monitor having 525 lines and a field frequency of 60 Hz, RGB 625/50 type monitor having 625 lines and a field frequency of 50 Hz, or low-resolution RGB monitor having an even smaller number of lines.

In FIGS. 2A and 2B, the multiplier circuit 380, adder circuit 400, memory 420, multiplier circuit 440, adder 460 circuit 460 and memory 480, constituting the second conversion route, respectively have the same functions as the constituents 210, 220, 240, 260, 280 and 300 of the first conversion route. Hence, a detailed description of the constituents 210–300 will not be made in order to avoid redundancy.

While one of the two conversion routes shown in FIGS. 2A and 2B is displaying the image of a subject on the monitor 29, the other route executes the conversion of the image. In the second route, for example, the multiplier circuit 380, adder circuit 400, memory 420, multiplier circuit 440 and adder circuit 460 are omissible if the output 283 of the adder circuit 280 is connected to the input of the memory 480. This also successfully implements the display of the image on the monitor 29 and the conversion of the image independently. Moreover, the entire second route, extending from the multiplier circuit 380 to the memory 480, may be omitted. Then, the first route will be so constructed as not to execute the conversion of the image while displaying the image on the monitor 29 or not to display the image while executing image conversion.

Further, the frame memory of the ADC 16 and the memories 240 and 420 of the movie processing 20 may be omitted, if desired. Then, the image data will be directly sent from the ADC 16 to the multiplier circuit 260 or 440 via the multiplier circuit 210 or 380 and adder circuit 220 or 400.

A reference will be made to FIGS. 3A–3D and FIGS. 4A–4D for describing how the various constituents of the movie processing 20 process the signals. FIGS. 3A–3D show pixel data appearing in the various sections constituting the movie processing 20. Generally, when use is made of a high-resolution CCD image sensor having a G stripe, RB full-checker filter arrangement, a display dot matrix has 1,280 dots in the horizontal direction and 1,024 dots in the vertical direction, as stated earlier. In FIG. 3A, the dot matrix available with this type of image sensor is shown as having only sixteen dots in the horizontal direction and four dots in the vertical direction for the sake of simplicity of illustration. On the other hand, FIGS. 4A–4D show pixel data output from the various sections of the movie processing 20 and derived from a high-resolution CCD image sensor having an RGB stripe color filter arrangement. While a dot matrix available with this type of image sensor also has 1,280 dots in the horizontal direction and 1,024 dots in the vertical direction, it is shown in FIG. 4A as having only twelve dots in the horizontal direction and four dots in the vertical direction. In FIGS. 3A–3D and 4A–4D, numerals arranged in a row and numerals arranged in a column indicate dot numbers in a line direction and line numbers, respectively.

First, how the processing 20 deals with the pixel data derived from the high-resolution image sensor having a G stripe, RB full-checker filter arrangement will be described with reference to FIGS. 1, 2A, 2B, and 3A–3D. The pixel signal output from the image sensor 12 is subjected to conventional processing, including gamma correction, by the preprocessing 14. The ADC 16 transforms the preprocessed analog image signal to digital values. In the illustrative embodiment, the digital values are written to the frame memory of the ADC 16 in accordance with the write control signal from the controller 38, as shown in FIG. 3A. The digital values, or image data R, G and B, are read out of the frame memory every other line in accordance with the read control signal from the controller 38. FIG. 3B shows the pixel data R, G and B on line Nos. 1 and 3 of FIG. 3A and read out of the frame memory. The pixel data R, G and B are fed to the multiplier circuit 210 via the selector 200. In the circuit 210, the R multiplier 212 multiplies the input pixel data $R_n$ by one of coefficients of 1, ¾, ½ and ¼ and delivers the resulting product to the R adder 222 of the adder circuit 220. Likewise, the G multiplier circuit 214 and B multiplier circuit 216 respectively multiply the input pixel data $G_n$ and $B_n$ by one of coefficients of 1, ¾, ½ and ¼ and deliver their outputs to the G adder 224 and B adder 226, respectively.

The R adder 222 adds, for example, ¼$R_2$ to ¾$R_1$ to produce $R_{1\ 1}$, and then adds ¼$R_4$ to ¾$R_3$ to produce $R_{2\ 2}$. By repeating such addition, the R adder 222 sequentially produces $R_{n\ n}$. The G adder 224 adds, for example, zero to $G_2$ to produce $G_{1\ 1}$, adds zero to G4 to produce $G_{2\ 2}$, and repeats the addition to sequentially produce $G_{n\ n}$. Further, the B adder 226 adds, for example, ¾$B_2$ to ¼$B_1$ to produce $B_{1\ 1}$, adds ¾$B_4$ to ¼$B_3$ to produce $B_{2\ 2}$, and repeats the addition to sequentially produce $B_{n\ n}$. The sums, or pixel data, Rnn, Gnn and Bnn are written to the memory 240 in accordance with the write control signal from the controller 38, as shown in FIG. 3C specifically. In this manner, as for the image data R, ¾$R_1$ and ¼$R_2$ are interpolated to produce $R_{1\ 1}$, and ¾$R_3$ and ¼$R_4$ are interpolated to produce $R_{2\ 2}$. As a result, a single pixel is output for two input pixels, that is, the pixel data is reduced, or thinned, by one pixel. This is also true with the pixel data G and B. As for the pixel data G, among four input pixels $G_1$, $G_2$, $G_3$ and $G_4$, for example, $G_2$ and $G_4$ are output while $G_1$ and $G_3$ are discarded. The method for such interpolation and thinning may be suitably selected on the basis of the system configuration applied.

The pixel data $R_{n\ n}$, $G_{n\ n}$ and $B_{n\ n}$ are read out of the memory 240 in response to the read control signal from the input control 320 and fed to the multiplier circuit 260. In the illustrative embodiment, the R multiplier 262 multiplies the input pixel data $R_{n\ n}$ by one of coefficients of 1, ¾, ½ and ¼ and delivers the resulting product to the R adder 282 of the adder 280. Likewise, the G multiplier 264 and B multiplier 266 respectively multiply the pixel data $G_{n\ n}$ and $B_{n\ n}$ by one of the coefficients of 1, ¾, ½ and ¼ and apply the resulting products to the G adder 284 and B adder 286.

In the adder circuit 280, the R adder 282 adds, for example, zero to $R_{1\ 1}$ to produce $R_{1\ 1\ 1}$, adds ¼$R_{2\ 2}$ to ¾$R_{1\ 1}$ to produce R222, adds ½$R_{2\ 2}$ to ½$R_{1\ 1}$ to produce $R_{3\ 3\ 3}$, adds ¾$R_{2\ 2}$ to 1 ¼$R_{1\ 1}$ to produce $R_{4\ 4\ 4}$, and adds zero to $R_{2\ 2}$ to produce $R_{5\ 5\ 5}$. The R adder 282 repeats this procedure to sequentially produce $R_{n\ n\ n}$. The G adder 284 adds, for example, zero to ½$G_{1\ 1}$ ("zero" meaning that pixel data $G_{0\ 0}$ to be added is absent at the left of $G_{1\ 1}$) to produce $G_{1\ 1\ 1}$, adds zero to $G_{1\ 1}$ to produce $G_{2\ 2\ 2}$, adds ½$G_{2\ 2}$ to ½$G_{1\ 1}$ to produce $G_{3\ 3\ 3}$, adds zero to $G_{2\ 2}$ to produce $G_{4\ 4\ 4}$, and repeats such a procedure to sequentially produce $G_{n\ n\ n}$. Further, the B adder 286 adds, for example, zero to ½$B_{1\ 1}$ ("zero" meaning that pixel data $B_{0\ 0}$ to be added is absent at the left of $B_{1\ 1}$) to produce $B_{1\ 1\ 1}$, adds zero to ¾$B_{1\ 1}$ to produce B222 ("zero" meaning that pixel data $B_{0\ 0}$ to be added is absent at the left of $B_{1\ 1}$), adds zero to $B_{1\ 1}$ to produce $B_{3\ 3\ 3}$, adds ¼$B_{2\ 2}$ to ¾$B_{1\ 1}$ to produce $B_{4\ 4\ 4}$, adds ½$B_{2\ 2}$ to ½$B_{1\ 1}$ to produce $B_{5\ 5\ 5}$, adds ¾$B_{2\ 2}$ to ¼$B_{1\ 1}$ to produce $B_{6\ 6\ 6}$, adds zero to $B_{2\ 2}$ to produce $B_{7\ 7\ 7}$, and repeats such a procedure to sequentially produce $B_{n\ n\ n}$. The pixel data $R_{n\ n\ n}$, $G_{n\ n\ n}$ and $B_{n\ n\ n}$ sequentially produced by the adder 280 are written to the memory 300 in response to the write control signal from the input control 320 in a format shown in FIG. 3D specifically. It will be seen from the above and FIGS. 3C and 3D that as for the pixel data R, $R_{2\ 2\ 2}$, $R_{3\ 3\ 3}$, $R_{6\ 6\ 6}$, $R_{7\ 7\ 7}$ and $R_{8\ 8\ 8}$ are the interpolating pixels, that as for the pixel data G, $G_{1\ 1\ 1}$, $G_{3\ 3\ 3}$, $G_{5\ 5\ 5}$ and $G_{7\ 7\ 7}$ are the interpolating pixels, and that as for the pixel data B, $B_{1\ 1\ 1}$, $B_{2\ 2\ 2}$, $B_{4\ 4\ 4}$, $B_{5\ 5\ 5}$, $B_{6\ 6\ 6}$ and $B_{8\ 8\ 8}$ are the interpolating pixels. A method of producing the interpolating pixels is open to choice and depends on the system configuration.

The pixel data $R_{n\ n\ n}$, $G_{n\ n\ n}$ and $B_{n\ n\ n}$ are read out of the memory 300 in response to the read control signal from the output control 340 and fed to the YC controller 360. The YC controller 360 produces a luminance signal $Y_{n\ n\ n}$ by, for example, $0.3R_{n\ n\ n}+0.59G_{n\ n\ n}+0.11B_{n\ n\ n}$, produces a chrominance signal $R_{n\ n\ n}-Y_{n\ n\ n}$ by $0.7R_{n\ n\ n}-0.59G_{n\ n\ n}-0.11B_{n\ n\ n}$, and produces a chrominance signal $B_{n\ n\ n}-Y_{n\ n\ n}$ by $-0.3R_{n\ n\ n}-0.59G_{n\ n\ n}+0.89B_{n\ n\ n}$. The signals $Y_{n\ n\ n}$, $R_{n\ n\ n}-Y_{n\ n\ n}$ and $B_{n\ n\ n}-Y_{n\ n\ n}$ appear on the output 106.

How the processing 20 deals with the pixel data derived from the high-resolution image sensor having an RGB stripe color filter arrangement will be described with reference to FIGS. 1, 2A, 2B, and 4A–4D. First, a pixel signal output from this type of image sensor 12 is also routed through the preprocessing 14 to the frame memory of the ADC 16. FIG. 4A shows a format in which digital pixel data R, G and B derived from the pixel signal are stored in the frame memory. The pixel data are read out of the frame memory every other line, as shown in FIG. 4B. FIG. 4B shows the pixel data on line Nos. 1 and 3 of FIG. 4A by way of example. The pixel data R, G and B from the frame memory are applied to the multiplier circuit 210 via the selector 200. In the circuit 210, the R multiplier 222, G multiplier 214 and B multiplier 216 operate in the same manner as described in relation to the image sensor having a G stripe, RB full-checker filter arrangement. The difference is that the multiplier 212 multiplies the input pixel data $R_n$ by one of coefficients of $\frac{5}{6}$ and $\frac{1}{6}$, while the multipliers 214 and 216 respectively multiply the pixel data $G_n$ and $B_n$ by one of coefficients of $\frac{5}{6}$, $\frac{1}{2}$ and $\frac{1}{6}$.

The R adder 222 adds, for example, $\frac{1}{6}R_2$ to $\frac{5}{6}R_1$ to produce $R_{1\ 1}$, and then adds $\frac{1}{6}R_4$ to $\frac{5}{6}R_3$ to produce $R_{2\ 2}$. By repeating such addition, the R adder 222 sequentially produces $R_{n\ n}$. The G adder 224 adds, for example, $\frac{1}{2}G_2$ to $\frac{1}{2}G_1$ to produce $G_{1\ 1}$, adds $\frac{1}{2}G_4$ to $\frac{1}{2}G_3$ to produce $G_{2\ 2}$, and repeats the addition to sequentially produce $G_{n\ n}$. Further, the B adder 226 adds, for example, $\frac{5}{6}B_2$ to $\frac{1}{6}B_1$ to produce $B_{1\ 1}$, adds $\frac{5}{6}B_4$ to $\frac{1}{6}B_3$ to produce $B_{2\ 2}$, and repeats the addition to sequentially produce $B_{n\ n}$. The sums, or pixel data, $R_{n\ n}$, $G_{n\ n}$ and $B_{n\ n}$ are written to the memory 240 in accordance with the write control signal from the controller 38, as shown in FIG. 4C specifically. In this manner, as for the image data R, $\frac{5}{6}R_1$ and $\frac{1}{6}R_2$ are interpolated to produce $R_{1\ 1}$, and $\frac{5}{6}R_3$ and $\frac{1}{6}R_4$ are interpolated to produce $R_{2\ 2}$. As a result, a single pixel is output for two input pixels, that is, the pixel data is reduced by one pixel. This is also true with the pixel data G and B. Again, the interpolation and thinning may be implemented by methods matching the system configuration.

The pixel data $R_{n\ n}$, $G_{n\ n}$ and $B_{n\ n}$ are read out of the memory 240 and applied to the multiplier circuit 260. In the circuit 260, the R multiplier 262, G multiplier 264 and B multiplier 266 operate in the same manner as in the previously described case, except that they respectively multiply the input pixel data $R_{n\ n}$, $G_{n\ n}$ and $B_{n\ n}$ by one of coefficients of 1, $\frac{2}{3}$ and $\frac{1}{3}$. The outputs of the R multiplier 262, G multiplier 264 and B multiplier 266 are respectively applied to the R adder 282, G adder 284 and B adder 286 constituting the adder circuit 280.

The R adder 282 adds, for example, zero to $R_{1\ 1}$ to produce $R_{1\ 1\ 1}$, adds $\frac{1}{3}R_{2\ 2}$ to $\frac{2}{3}R_{1\ 1}$ to produce $R_{2\ 2\ 2}$, adds $\frac{2}{3}R_{2\ 2}$ to $\frac{1}{3}R_{1\ 1}$ to produce $R_{3\ 3\ 3}$, and adds zero to $R_{2\ 2}$ to produce $R_{4\ 4\ 4}$. The R adder 282 repeats this procedure to sequentially produce $R_{n\ n\ n}$. The G adder 284 adds, for example, zero to $\frac{2}{3}G_{1\ 1}$ ("zero" meaning that pixel data $G_0$ $_0$ to be added is absent at the left of $G_{1\ 1}$) to produce $G_{1\ 1\ 1}$, adds zero to $G_{1\ 1}$ to produce $G_{2\ 2\ 2}$, adds $\frac{1}{3}G_{2\ 2}$ to $\frac{2}{3}G_{1\ 1}$ to produce $G_{3\ 3\ 3}$, adds $\frac{2}{3}G_{2\ 2}$ to $\frac{1}{3}G_{1\ 1}$ to produce $G_{4\ 4\ 4}$, adds zero to $G_{2\ 2}$ to produce $G_{5\ 5\ 5}$, and repeats such a procedure to sequentially produce $G_{n\ n\ n}$. Further, the G adder 286 adds, for example, zero to $\frac{1}{3}B_{1\ 1}$ ("zero" meaning that pixel data $B_{0\ 0}$ to be added is absent at the left of $B_{1\ 1}$) to produce $B_{1\ 1\ 1}$, adds zero to $\frac{2}{3}B_{1\ 1}$ to produce $B_{2\ 2\ 2}$ ("zero" meaning that pixel data $B_{0\ 0}$ to be added is absent at the left of $B_{1\ 1}$), adds zero to $B_{1\ 1}$ to produce $B_{3\ 3\ 3}$, adds $\frac{1}{3}B_2$ $_2$ to $\frac{2}{3}B_{1\ 1}$ to produce $B_{4\ 4\ 4}$, adds $\frac{2}{3}B_{2\ 2}$ to $\frac{1}{3}B_{1\ 1}$ to produce $B_{5\ 5\ 5}$, adds zero to $B_{2\ 2}$ to produce $B_{6\ 6\ 6}$, and repeats such a procedure to sequentially produce $B_{n\ n\ n}$. The pixel data $R_{n\ n\ n}$, $G_{n\ n\ n}$ and $B_{n\ n\ n}$ sequentially produced by the adder 280 are written to the memory 300 in a format shown in FIG. 4D specifically. It will be seen from the above and FIGS. 4C and 4D that as for the pixel data R, $R_{2\ 2\ 2}$, $R_{3\ 3\ 3}$, $R_{5\ 5\ 5}$ and $R_{6\ 6\ 6}$ are the interpolating pixels, that as for the pixel data G, $G_{1\ 1\ 1}$, $G_{3\ 3\ 3}$, $G_{4\ 4\ 4}$ and $G_{6\ 6\ 6}$ are the interpolating pixels, and that as for the pixel data B, $B_{1\ 1\ 1}$, $B_{2\ 2\ 2}$, $B_{4\ 4\ 4}$ and $B_{5\ 5\ 5}$ are the interpolating pixels. Again, a method of producing the interpolating pixels is open to choice and may be selected in matching relation to the system configuration.

On receiving the above pixel data $R_{n\ n\ n}$, $G_{n\ n\ n}$ and $B_{n\ n\ n}$ read out of the memory 300, the YC converter 360 outputs a luminance signal $Y_{n\ n\ n}$ and chrominance signals $R_{n\ n\ n}-Y_{n\ n\ n}$ and $B_{n\ n\ n}-Y_{n\ n\ n}$ by performing the specific calculations described in relation to the G stripe, full-checker filter arrangement.

The operation of the camera 1 will be described hereinafter. First, assume that the imaging device 12 is implemented by a CCD image sensor of standard resolution, and that an optical image incident to the image sensor is displayed on an NTSC monitor. A procedure for a pixel signal from the image sensor 12 to be displayed on the NTSC monitor is as follows.

The image sensor 12 scans the 640×512 dots or pixels of an incident optical image and generates a corresponding pixel signal. The pixel signal is routed through the preprocessing 14 to the ADC 16. After digital image data have been written to the frame memory of the ADC 16 in the previously stated manner, they are read thereoutof in response to a non-interlace read control signal fed from the controller 38. The image data R, G and B from the frame memory are delivered to the YC processing 18. As a result, luminance data Y and chrominance data R-Y and B-Y are fed from the YC processing 18 to the postprocessing 22. The DAC 24 transforms the resulting output of the processing 18 to an image signal, i.e., analog values. The image signal is reproduced on the NTSC monitor 29 via the reproduction 26.

Assume that the imaging device 12 is a high-resolution CCD image sensor having a G stripe, RB full-checker filter arrangement, and that use is made of an NTSC monitor. The procedure described above in relation to the standard resolution also occurs except for the following. In this case, the image sensor 12 scans the 1,280×1,024 dots or pixels of an incident optical image. In the illustrative embodiment, the ADC 16 writes digital image data derived from the incident image in the frame memory in 120 milliseconds. At this instant, the image data are written to the frame memory in the format shown in FIG. 3A.

The image data are read out of the frame memory every other line and then routed through the selector 200 and multiplier circuit 210 to the adder circuit 220 while being subjected to the arithmetic operation stated earlier. The adder 220 circuit, made up of the R adder 222, G adder 224 and B adder 226, produces pixel data $R_{n\ n}$, $G_{n\ n}$ and $B_{n\ n}$ by the previously stated iterative procedure. The pixel data are written to the memory 240. Specifically, pixel data reduced, or thinned, by the controller 38 and having 640 (vertical)× 512 (horizontal) dots, as stated earlier, are stored in the memory 240 in the format shown in FIG. 3C.

The pixel data $R_{n\,n}$, $G_{n\,n}$ and $B_{n\,n}$ are read out of the memory 240 and fed to the multiplier circuit 260. The circuit 260 produces pixel data $R_{n\,n\,n}$, $G_{n\,n\,n}$ and $B_{n\,n\,n}$ by the previously stated arithmetic operation. The pixel data $R_{n\,n\,n}$, $G_{n\,n\,n}$ and $B_{n\,n\,n}$ are written to the memory 300. Specifically, because the adder circuit 280 delivers the pixel data R, G and G at the sampling points, the pixel data are stored in the memory 300 in a 640 (horizontal)×512 (vertical) dot matrix, as represented by the arrangement of FIG. 3D. Because the image data are suitably thinned, the pixel data $R_{n\,n\,n}$, $G_{n\,n\,n}$ and $B_{n\,n\,n}$ are fully written to the memory 300 within 120 milliseconds after the pixel data have been read out of the frame memory of the ADC 16. Therefore, the real-time display of the pixel data stored in the memory 300 is achievable with the NTSC monitor 29 via the reproduction 26. Moreover, if the monitor 29 has a lower resolution than an NTSC monitor, more pixel data can be discarded. This will further reduce the interval between the time when the pixel data are read out of the frame memory of the ADC 16 and the time when the pixel data $R_{n\,n\,n}$, $G_{n\,n\,n}$ and $G_{n\,n\,n}$ are written to the memory 300.

The pixel data $R_{n\,n\,n}$, $G_{n\,n\,n}$ and $B_{n\,n\,n}$ are read out of the memory 300 and applied to the YC converter 360. The converter 360 produces luminance data $Y_{n\,n\,n}$ and chrominance data $R_{n\,n\,n}-Y$ and $B_{n\,n\,n}-Y$ by performing the arithmetic operation stated earlier. The data $Y_{n\,n\,n}$, $R_{n\,n\,n}Y$ and $B_{n\,n\,n}-Y$ are fed to the postprocessing 22. The postprocessing 22 executes contour correction with the luminance data Y and color correction with the chrominance data R-Y and B-Y. The DAC 24 transforms the corrected data Y, R-Y and B-Y to an image signal and sends it to the NTSC monitor 29 via the reproduction 26. As a result, the image from the camera 1 is displayed on the monitor 29. While the above processing has concentrated on image data in the horizontal scanning direction, it will be apparent that image data in the vertical direction can be processed in the same manner.

Assume that the imaging device 12 is implemented by a high-resolution CCD image sensor having an RGB stripe color filter arrangement, and that the image of a subject incident to the image sensor is displayed on an NTSC monitor. A pixel signal output from the image sensor 12 are transformed to an NTSC image signal and displayed on the NTSC monitor 29 by the procedure described with reference to FIGS. 4A–4D. Specifically, the image data having 1,280× 1,024 dots from the image sensor 12 are written to the frame memory of the ADC 16 in the format shown in FIG. 4A. Subsequently, the image data having 640 (horizontal)×512 (vertical) dots and generated by the adder circuit 220 are written to the memory 240 in the format shown in FIG. 4C. Thereafter, pixel data $R_{n\,n\,n}$, $G_{n\,n\,n}$ and $B_{n\,n\,n}$ from the adder circuit 280 are written to the memory 300 in the format shown in FIG. 4D. Finally, the pixel data $R_{n\,n\,n}$, $G_{n\,n\,n}$ and $B_{n\,n\,n}$ are read out of the memory 300 and displayed on the monitor 29 via the reproduction 26 in the same manner as with the G stripe, RB full-checker filter arrangement. Again, pixel data in the vertical direction can be processed in the same way as the above-stated pixel data in the horizontal direction.

As stated above, when the imaging device 12 of the camera 1 is implemented by a high-resolution CCD image sensor, the movie processing 20 converts the number of pixels of a high-resolution image incident to the image sensor 12 to the number of pixels which can be displayed on an NTSC monitor.

In summary, in accordance with the present invention, an electronic still camera includes means for transforming, when imaging means also included in the camera has a high resolution, image data generated by the imaging means to image data which can be displayed on a real-time basis on a monitor having an NTSC or similar standard resolution or even lower resolution. Hence, even an image incident to the high-resolution imaging means can be displayed on an ordinary monitor of standard resolution. Particularly, the present invention is advantageously applicable to an electronic still camera of the type shooting scenes with a high resolution. The camera of the present invention eliminates the need of a high-resolution monitor and, therefore, reduces the cost of a monitor system as well as the space for the installation of a monitor. Further, because the processing means converts the image incident to the high-resolution imaging means to image data free from distortions, the operator of the camera can, for example, shoot a desired subject in an accurate direction. In addition, in a system wherein the camera is operated at a position remote from a monitor, the operator can effectively remote-control the angle of the camera relative to a subject, as well as other factors particular to the camera, while watching the real-time display of a distortion-free image on the monitor.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, the embodiment has been shown and described in relation to a high-resolution CCD image sensor having a 1,280×1,024 dot matrix and implemented by a G stripe, RB full-checker filter arrangement or an RGB stripe color filter arrangement, and an NTSC monitor. Alternatively, the high-resolution image sensor may be of the type having a Bayer color filter arrangement, interline color filter arrangement, G stripe, RB checker filter arrangement, or diagonal stripe color filter arrangement. Likewise, the monitor may be a PAL monitor, SECAM monitor, 525/60 RGB monitor, 625/50 RGB monitor, or monitor of even lower resolution.

What is claimed is:

1. An electronic still camera comprising:
    an imaging device for shooting a subject and outputting a corresponding first color image signal having a high resolution and to be recorded in a recording medium;
    a processing circuit for thinning said first image signal to thereby produce a second image signal having a low resolution, the thinning including averaging pixel data of the first image data with a weight corresponding to a spatial distance between adjacent pixels of the same color;
    an output terminal for outputting said second image signal on a real-time basis; and
    a viewfinder, connected to said output terminal, for displaying a color image represented by said second image signal from said output terminal, and implemented by a video monitor.

2. A camera in accordance with claim 1, further comprising a circuit for connecting said output terminal and said viewfinder by a wire.

3. A camera in accordance with claim 1, further comprising a circuit for connecting said output terminal and said viewfinder by radio.

4. A camera in accordance with claim 1, wherein said viewfinder comprises one of an NTSC monitor, a PAL monitor, a SECAM monitor, an RGB monitor having 525 lines and a frequency of 60 Hz, and an RGB monitor having 525 lines and a frequency of 50 Hz.

5. A camera in accordance with claim 1, wherein said imaging device comprises a high-resolution CCD image sensor.

6. An electronic still camera comprising:

a high-resolution imaging device for shooting a subject and outputting corresponding high-resolution pixel data to be recorded in a recording medium, said pixel data consisting of a plurality of predetermined colors repeatedly appearing in a predetermined order at least in a direction of horizontal scanning lines;

a processing circuit for thinning said high-resolution pixel data output from said imaging device to thereby produce low-resolution image data, the thinning including averaging the high-resolution pixel data with a weight corresponding to a spatial distance between adjacent pixels of the same color;

an output terminal for outputting said low-resolution image data on a real-time basis; and a viewfinder connected to said output terminal, and for displaying a color image represented by said low-resolution image data from said output terminal, and implemented by a video monitor.

7. A camera in accordance with claim 6, further comprising a circuit for connecting said output terminal and said viewfinder by a wire.

8. A camera in accordance with claim 6, further comprising a circuit for connecting said output terminal and said viewfinder by radio.

9. A camera in accordance with claim 6, wherein said viewfinder comprises one of an NTSC monitor, a PAL monitor, a SECAM monitor, an RGB monitor having 525 lines and a frequency of 60 Hz, and an RGB monitor having 525 lines and a frequency of 50 Hz.

10. A camera in accordance with claim 6, wherein said imaging device comprises a high-resolution CCD image sensor.

11. A camera in accordance with claim 6, wherein said plurality of predetermined colors include at least either a first color representative of red and a second color representative of green, or a second color representative of green and a third color representative of blue;

said processing circuit comprising:

a thinning circuit for receiving said pixel data from said imaging device, and for thinning said pixel data in response to a predetermined thinning control signal to thereby output pixel data in which a plurality of predetermined colors repeatedly appear in a predetermined order at least in the direction of horizontal scanning lines;

an interpolating circuit for receiving said pixel data from said thinning circuit, for generating, in response to a predetermined interpolation control signal, pixel data of a predetermined color at a predetermined position and different from another predetermined color at said predetermined position to thereby output pixel data of a first color, a second color and a third color respectively representative of red, green and blue at said predetermined position;

a first storage for storing said pixel data fed from said interpolating circuit;

a first controller for controlling said first storage, and for generating control signals including said thinning control signal and said interpolation control signal; and a second controller for feeding a read control signal to said first storage;

said pixel data stored in said first storage being read out in response to said read control signal and sent to said viewfinder via said output terminal.

12. A camera in accordance with claim 11, wherein said interpolating circuit comprises:

a multiplier for receiving said pixel data from said imaging device, and for multiplying said pixel data at predetermined positions by predetermined coefficients to thereby output products; and an adder for receiving said products, and for adding the pixel data of a predetermined color at a predetermined position and the pixel data of said predetermined color at another predetermined position to thereby output interpolating pixel data.

13. A camera in accordance with claim 11, wherein said imaging device comprises a high-resolution CCD image sensor.

14. An electronic still camera comprising:

a high-resolution imaging device for shooting a subject and outputting corresponding high-resolution pixel data to be recorded in a recording medium, said pixel data consisting of a plurality of predetermined colors repeatedly appearing in a predetermined order at least in a direction of horizontal scanning lines, said plurality of predetermined colors including at least either a first color representative of red and a second color representative of green, or a second color representative of green and a third color representative of blue;

a processing circuit for thinning said high-resolution image data output from said imaging device to thereby produce low-resolution image data;

an output terminal for outputting said low-resolution image data on a real-time basis;

a viewfinder connected to said output terminal, for displaying an image represented by said low-density image data from said output terminal, and implemented by a video monitor;

wherein said processing circuit includes:

a thinning circuit for receiving said pixel data from said imaging device, and for thinning said pixel data in response to a predetermined thinning control signal to thereby output pixel data in which a plurality of predetermined colors repeatedly appear in a predetermined order at least in the direction of horizontal scanning lines;

an interpolating circuit for receiving said pixel data from said thinning circuit, for generating, in response to a predetermined interpolation control signal, pixel data of a predetermined color at a predetermined position and different from another predetermined color at said predetermined position to thereby output pixel data of a first color, a second color and a third color respectively representative of red, green and blue at said predetermined position;

a first storage for storing said pixel data fed from said interpolating circuit;

a first controller for controlling said first storage, and for generating control signals including said thinning control signal and said interpolation control signal;

a second controller for feeding a read control signal to said first storage;

said pixel data stored in said first storage being read out in response to said read control signal and sent to said viewfinder via said output terminal;

a converting circuit for receiving said pixel data read out of said first storage and generating, in response to a predetermined conversion control signal, luminance data and two kinds of chrominance data from, among said pixel data, at least the pixel data respectively representative of said first, second and third colors at a predetermined position; and a third controller for generating control signals including said conversion control signal;

said third controller controlling said converting circuit to send said luminance data and said two kinds of chrominance data to said viewfinder via said output terminal.

15. An electronic still camera comprising:

a high-resolution imaging device for shooting a subject and outputting corresponding high-resolution pixel data to be recorded in a recording medium, said pixel data consisting of a plurality of predetermined colors repeatedly appearing in a predetermined order at least in a direction of horizontal scanning lines, said plurality of predetermined colors including at least either a first color representative of red and a second color representative of green, or a second color representative of green and a third color representative of blue;

a processing circuit for thinning said high-resolution image data output from said imaging device to thereby produce low-resolution image data;

an output terminal for outputting said low-resolution image data on a real-time basis;

a viewfinder connected to said output terminal, for displaying an image represented by said low-density image data from said output terminal, and implemented by a video monitor;

wherein said processing circuit includes:

a thinning circuit for receiving said pixel data from said imaging device, and for thinning said pixel data in response to a predetermined thinning control signal to thereby output pixel data in which a plurality of predetermined colors repeatedly appear in a predetermined order at least in the direction of horizontal scanning lines;

an interpolating circuit for receiving said pixel data from said thinning circuit, for generating, in response to a predetermined interpolation control signal, pixel data of a predetermined color at a predetermined position and different from another predetermined color at said predetermined position to thereby output pixel data of a first color, a second color and a third color respectively representative of red, green and blue at said predetermined position;

a first storage for storing said pixel data fed from said interpolating circuit;

a first controller for controlling said first storage, and for generating control signals including said thinning control signal and said interpolation control signal;

a second controller for feeding a read control signal to said first storage;

said pixel data stored in said first storage being read out in response to said read control signal and sent to said viewfinder via said output terminal; and a second storage for storing said pixel data output from said interpolating circuit;

said pixel data stored in said second storage being read out under the control of said second controller when said pixel data processed by said interpolating circuit are being written to said first storage under the control of said first controller.

16. An electronic still camera comprising:

a high-resolution imaging device for shooting a subject and outputting corresponding high-resolution pixel data to be recorded in a recording medium, said pixel data consisting of a plurality of predetermined colors repeatedly appearing in a predetermined order at least in a direction of horizontal scanning lines, and being of a resolution higher than a resolution of a standard television signal format;

a processing circuit for thinning said high-resolution image data output from said imaging device to thereby produce low-resolution image data which are of the resolution of the standard television signal format;

a viewfinder connected to said processing circuit for displaying an image represented by said low-density image data from said processing circuit;

said plurality of predetermined colors including at least either a first color representative of red and a second color representative of green, or a second color representative of green and a third color representative of blue;

said processing circuit including:

a thinning circuit for receiving said pixel data from said imaging device, and for thinning said pixel data in response to a thinning control signal to thereby output pixel data in which a plurality of predetermined colors repeatedly appear in a predetermined order at least in the direction of horizontal scanning lines;

an interpolating circuit for receiving said pixel data from said thinning circuit, for generating, in response to an interpolation control signal, pixel data of a predetermined color at a predetermined position and different from another predetermined color at said predetermined position to thereby output pixel data of a first color, a second color and a third color respectively representative of red, green and blue at said predetermined position;

a first storage for storing said pixel data fed from said interpolating circuit;

a first controller for controlling said first storage, and for generating control signals including said thinning control signal and said interpolation control signal;

a second controller for feeding a read control signal to said first storage, said read control signal causing said pixel data stored in said first storage to be read out from said first storage and sent to said viewfinder;

a converting circuit for receiving said pixel data read out of said first storage and generating, in response to a conversion control signal, luminance data and two kinds of chrominance data from, among said pixel data, at least the pixel data respectively representative of said first, second and third colors at a predetermined position; and a third controller for generating control signals including said conversion control signal;

said third controller controlling said converting circuit to send said luminance data and said two kinds of chrominance data to said viewfinder.

17. A camera in accordance with claim 1, wherein said high resolution is higher than the standard television signal format.

18. A camera in accordance with claim 6, wherein said high resolution is higher than the standard television signal format.

19. A method for displaying an image on a video monitor viewfinder of an electronic still camera in real time comprising the steps of:

shooting a subject and outputting a corresponding first color image signal having a high resolution and to be recorded in a recording medium;

thinning said first image signal by averaging pixel data of the first image signal with a weight corresponding to a spatial distance between adjacent pixels of the same color to thereby produce a second image signal having a low resolution;

outputting said second image signal on a real-time basis; and displaying a color image represented by said second image signal from said output terminal on the video monitor.

20. A method for displaying an image on a video monitor viewfinder of an electronic still camera in real time comprising the steps of:

shooting a subject and outputting a corresponding first image signal having a high resolution and to be recorded in a recording medium;

thinning said first image signal to thereby produce a second image signal having a low resolution;

outputting said second image signal on a real-time basis;

displaying an image represented by said second image signal from said output terminal on the video monitor;

interpolating, from said second image signal and in response to a predetermined interpolation control signal, pixel data of a predetermined color at a predetermined position and different from another predetermined color at said predetermined position to thereby output pixel data of a first color, a second color and a third color respectively representative of red, green and blue at said predetermined position;

storing said pixel data fed from said interpolating step in a first storage;

reading out said pixel data stored in said first storage in response to a read control signal and sent to said video monitor via said output terminal;

converting said pixel data read out of said first storage, in response to a predetermined conversion control signal, to luminance data and two kinds of chrominance data from, among said pixel data, at least the pixel data respectively representative of said first, second and third colors at a predetermined position; and outputting said luminance data and said two kinds of chrominance data to said video monitor via said output terminal.

21. A method for displaying an image on a video monitor viewfinder of an electronic still camera in real time comprising the steps of:

shooting a subject and outputting a corresponding first image signal having a high resolution and to be recorded in a recording medium;

thinning said first image signal to thereby produce a second image signal having a low resolution;

outputting said second image signal on a real-time basis;

displaying an image represented by said second image signal from said output terminal on the video monitor;

interpolating, from said second image signal and in response to a predetermined interpolation control signal, pixel data of a predetermined color at a predetermined position and different from another predetermined color at said predetermined position to thereby output pixel data of a first color, a second color and a third color respectively representative of red, green and blue at said predetermined position;

storing said pixel data fed from said interpolating step in a first storage;

reading out said pixel data stored in said first storage in response to a read control signal and sent to said video monitor via said output terminal;

storing said pixel data fed from said interpolating step in a second storage; and reading out said pixel data stored in said second storage when said pixel data from said interpolating step are being written to said first storage.

* * * * *